(No Model.)

3 Sheets—Sheet 1.

J. THOMSON.
WATER METER.

No. 568,641. Patented Sept. 29, 1896.

WITNESSES:

INVENTOR:

(No Model.) 3 Sheets—Sheet 2.

J. THOMSON.
WATER METER.

No. 568,641. Patented Sept. 29, 1896.

WITNESSES: INVENTOR:

(No Model.) 3 Sheets—Sheet 3.

J. THOMSON.
WATER METER.

No. 568,641. Patented Sept. 29, 1896.

WITNESSES: INVENTOR:

UNITED STATES PATENT OFFICE.

JOHN THOMSON, OF BROOKLYN, NEW YORK, ASSIGNOR TO THE NEPTUNE METER COMPANY, OF JERSEY CITY, NEW JERSEY.

WATER-METER.

SPECIFICATION forming part of Letters Patent No. 568,641, dated September 29, 1896.

Application filed February 19, 1896. Serial No. 579,917. (No model.)

*To all whom it may concern:*

Be it known that I, JOHN THOMSON, a citizen of the United States, residing at Brooklyn, Kings county, State of New York, have invented certain new and useful Improvements in Water-Meters, of which the following is a specification.

This invention relates to disk water-meters, the objects and advantages of which will be pointed out in the body of the specification.

Figure 1:
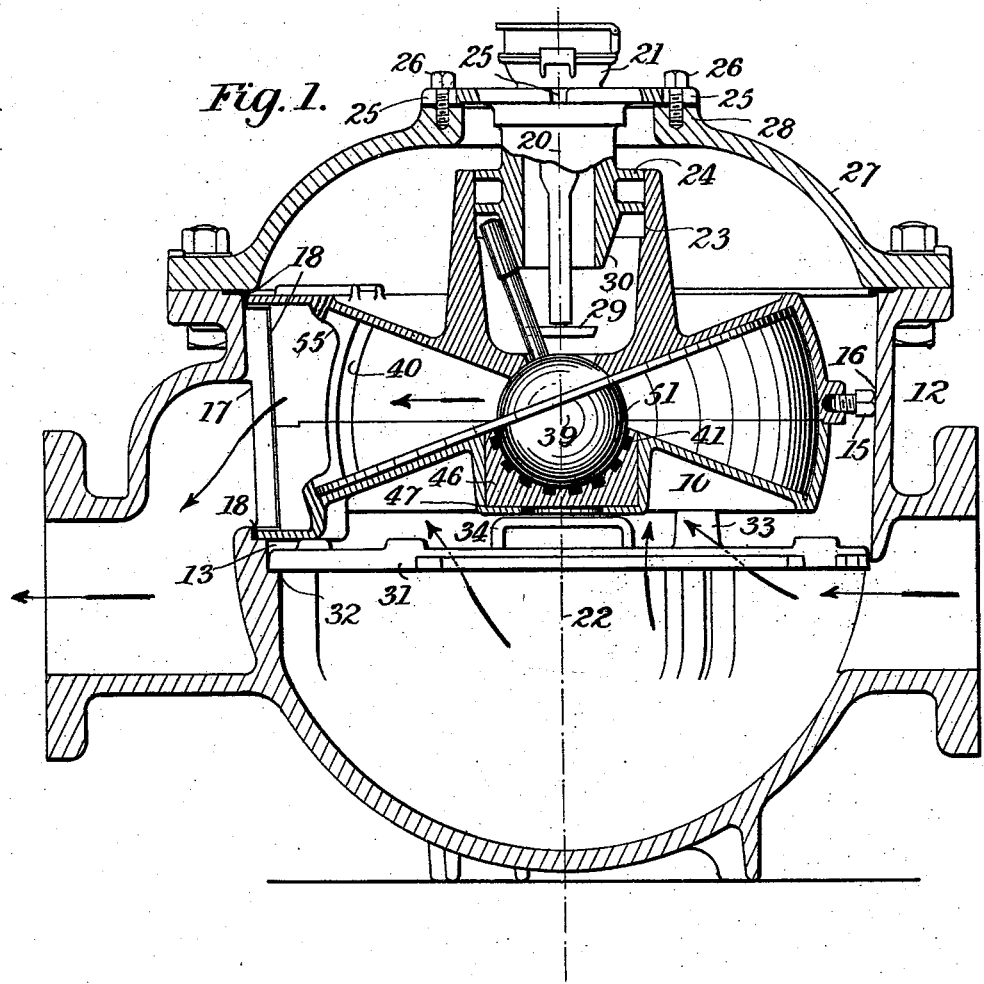
Figure 2:
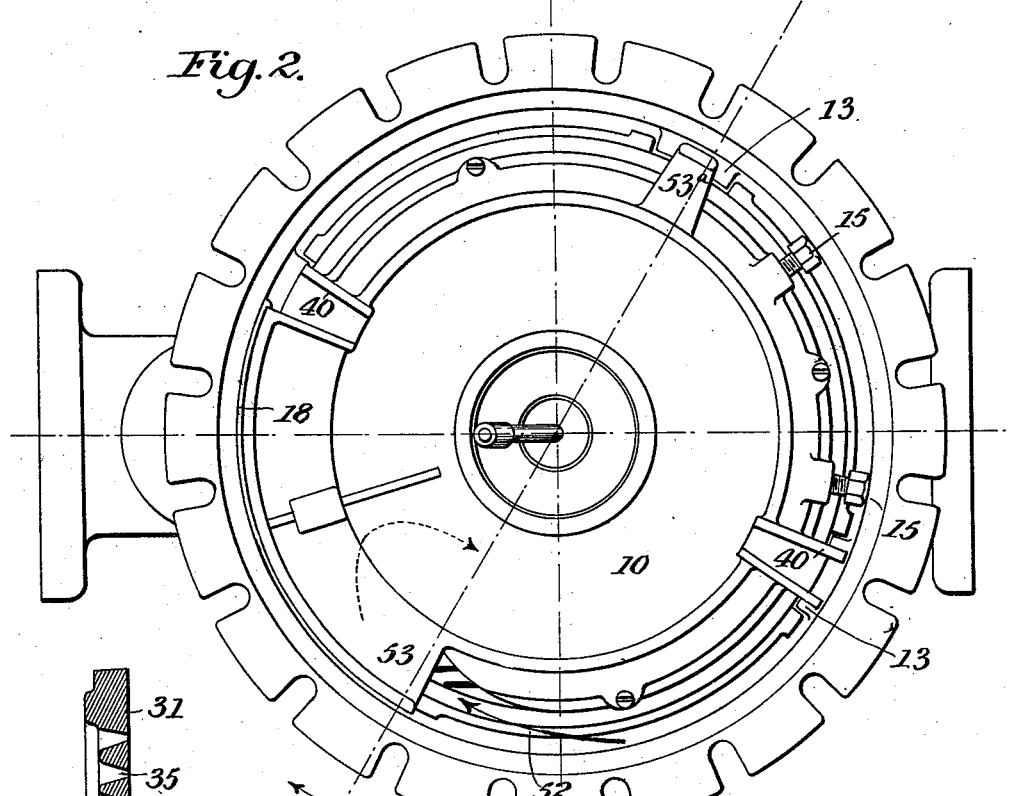
Figures 3, 5:
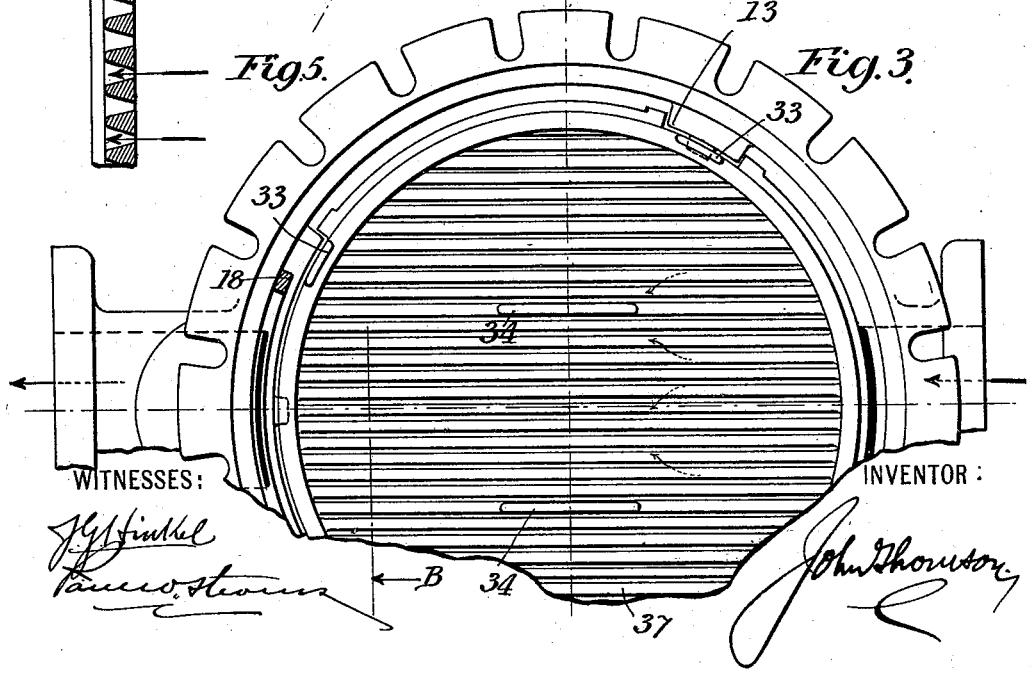
Figure 4:
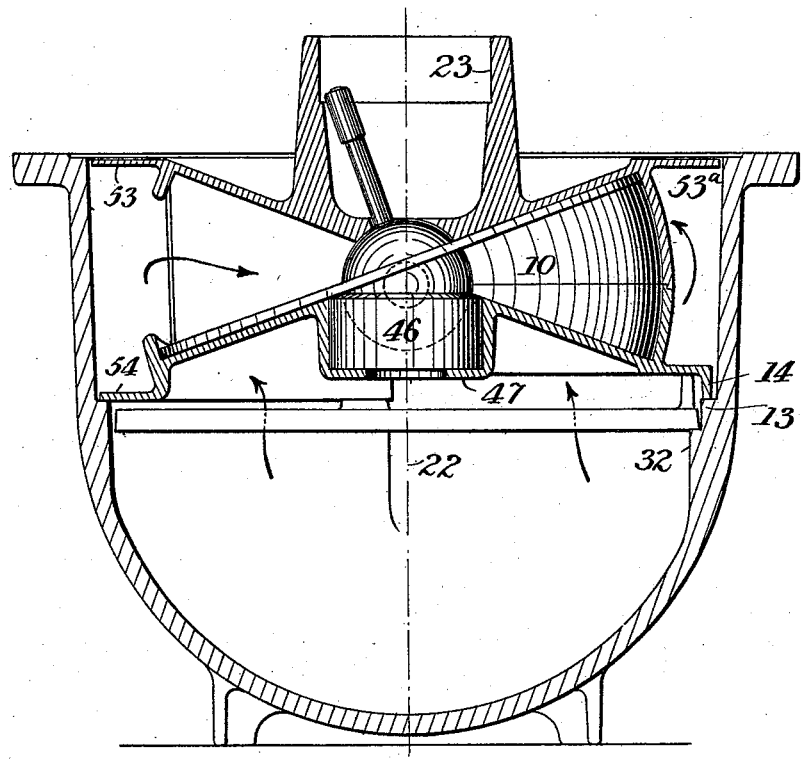
Figure 6:
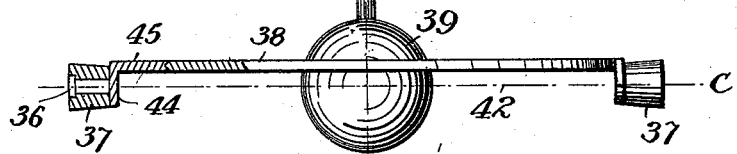
Figure 7:
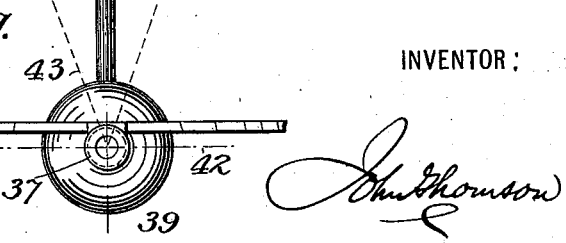

In the drawings, Figure 1 is a longitudinal vertical center section of one form of meter embodying my invention. Fig. 2 is a top plan of the lower main casing, showing the disk-casing in position therein. Fig. 3 is a partial view similar to that of Fig. 2, the disk-casing removed to show the strainer-plate. Fig. 4 is a partial transverse center section on the line A of Fig. 2. Fig. 5 is a detail cross-section through a portion of the strainer-plate, as on B, Fig. 3. Fig. 6 is an edge view of the ball and disk, showing the thrust-rollers both in full lines and in section. Fig. 7 is a view of the disk, but taken from the outer end of one of the thrust-rollers, as from C.

The first feature is in the manner of applying the disk-casing 10 to the main casing 12, consisting in providing the interior of the latter with projecting lugs 13, upon which rest suitable projections or feet 14 on the disk-casing to sustain the same. There is a bearing in the outer casing around the outlet 17, adapted to a bearing around the outlet of the disk-casing with an intervening gasket, if desired, whereby a perfect joint is secured by forcing the disk-casing to one side by any suitable appliance. Thus the disk-chamber is provided with a bolt or bolts, as 15, preferably situated in its outer edge, their heads to impinge upon the inner wall of the main casing, as at 16. Around the outlet 17 of the main casing is a suitable gasket 18, of yielding material, whose general conformation corresponds to that of the outlet of the disk-casing. Now, having first turned the bolts 15 inwardly, the disk-casing may be freely placed so as to rest on its supports. Then by simply turning the bolts outwardly against the wall of the main casing the disk-casing will be forced over against the gasket, producing a tight joint between the outlet-openings of both casings. In this wise the main casing does not require to be machined, the commercial advantage of which will be obvious. The gasket may be dispensed with when the bearing-faces fit nicely.

The second feature has reference to the manner of bringing the vertical center 20 of the exterior register-casing 21 concentric with the vertical center 22 of the disk-casing. Obviously after thrusting the disk-casing over to make a joint, as described, its vertical center may or may not coincide with that of the main casing. To overcome this difficulty, I form a cylindrical recess or bearing 23 on the top of the disk-casing, adapting thereto an inwardly-projecting hub 24 of the register-casing. Openings or slots 25 are formed in the flange of the register-casing larger than the bodies of the bolts 26, so that the latter have no control to center the register-casing. Hence when the disk-casing is in place and the cap 27 bolted down to its seat the register-casing may be then inserted and bolted down to its seat 28 on the top of the cap, even if eccentric thereto. Further, a slip or telescopic joint is formed between the hub and the disk-casing, whereby the driving-arm 29 of the internal gear-train and the cone 30 for controlling the action of the disk-spindle are maintained in proper relation without regard to the alinement of the main casing or of the cap.

The third feature is comprised in the strainer-plate 31, which, like the disk-casing, is adapted to rest upon lugs, as 32, in the main casing and is prevented from being blown upward by the projections 33 on its upper surface, which impinge against the lower surface of the disk-casing. For convenience in withdrawing and inserting handles, as 34, may be applied. An important element in this is the form and disposal of the strainer-spaces 35, which are wedge-shaped in cross-section, as see Fig. 5, the narrow opening with sharp edges being presented toward the inflowing water. While this produces a greater obstruction to the flow than if the condition were reversed, it has the more important practical advantage of being less likely to clog. There is no tendency for matter to collect and pack, as anything that will enter the space from below will pass through freely. Still another element is that the strainer-spaces are parallel to each other, and that the strainer is applied to the casing so that these spaces will lie in the same direction as the flow from the inlet, Fig. 3. Hence the inflowing jet, being of relatively high velocity, will tend to wash the spaces longitudinally as well as vertically, preventing the annoyance of clogging from leaves, vegetable growth, and the like, so frequently experienced when perforated or circular strainer-spaces are used.

The fourth feature has reference to the disposal of the bearings 36 of the thrust-rollers 37 with respect to the disk 38, the ball 39, and the bearing-slots 40 of the disk-casing. In my patent of March 12, 1895, No. 535,641, I have shown the application of two thrust-rollers to a disk when the said disk is disposed in the medium plane of the ball, that is, the axis of the rollers are in the medium plane both of the ball and of the disk; but in the present case it is to be observed that the medium plane of the disk is at one side of the medium plane 42 of the ball. Hence in view of the angular movement of the disk, as indicated by the play of the spindles (see dotted lines 43 of Fig. 7,) the axis of the rollers must lie in the medium plane 42 of the ball. This construction may be effectively made by having the bearing 36 connected to or as a part of the offset 44 of the plate 45, the latter secured to the disk.

The fifth feature has reference to the manner of conducting the water from the interior of the main casing to the inlet-port of the disk-casing, that is, around the exterior thereof, circumferentially, as particularly denoted by the arrow 52 of Fig. 2. This is effected by the flanges 53 54, formed upon the upper and lower sections of the disk-casing and extending around to any desired extent; but as here shown they terminate near the outer edge of the inlet-port 55. In this manner the flow toward the edges of the flanges may come from the bottom, from the top, from the side, or in a swirling mass from all these directions; but the port can only be reached by a solid stream in which the procession is approximately uniform. The advantage of this is to maintain a more uniform delivery into the chamber of the disk-casing. In this connection I call attention that the upper flange 53 may be extended entirely around the disk-casing, as at 53ª, so as to prevent the inflowing water from freely reaching the space immediately under the cap; but as a matter of fact this space, as shown, is like the "dead end" of a pipe, the flow through the meter being properly indicated by the arrows which I have placed on the drawings.

Without limiting myself to the precise construction and arrangement shown, I claim—

1. The main casing of a meter containing a separate disk-casing, a joint between the two surrounding the outlets and means for forcing the disk-casing over, transversely to close the joint, substantially as described.

2. The combination of the main casing, the disk-casing the gasket interposed between their outlet-openings and means, for forcing the disk-casing over, transversely, to compress the gasket, substantially as described.

3. The combination with the main casing having an opening for the register-casing, a disk-casing, a register-casing, having a bearing in the disk-casing and adapted to close the main-casing opening when in different positions, substantially as described.

4. The combination of the disk-casing provided with a cylindrical recess, or bearing as 23, with the register-casing having a flange and an inwardly-projected hub adapted to engage the same, and means for bolting the flange to the main casing whatever may be the position of the register-casing, substantially as described.

5. The combination with the disk-casing, the disk and the disk-spindle, of the controlling-cone, as 30, the said cone being connected to the exterior register-casing but guided and maintained concentrically by a slip-joint connection with the disk-casing; substantially as described.

6. The combination with the ball and the disk of the thrust-rollers mounted upon bearings whose axis is at one side of the medium plane of the disk, substantially as specified.

7. The combination with the disk-casing, the ball and the disk, the medium plane of the disk being at one side of the plane of the ball, of the thrust-rollers having their axis in the medium plane of the ball, substantially as specified 8. In a disk water-meter, the combination with the main casing, the disk-casing and disk therein of the flanges, as 53 54, disposed above and below the inlet-port, substantially as specified.

In testimony whereof I have signed my name to this specification in the presence of two subscribing witnesses.

JOHN THOMSON.

Witnesses:
GEO. L. DE FRAINE,
MEYER KRASNER.